(12) United States Patent
Gunton

(10) Patent No.: US 6,329,931 B1
(45) Date of Patent: Dec. 11, 2001

(54) LOADING BAY DOCK CONTROL

(76) Inventor: Bruce Stanley Gunton, 3, Gisborne Close, Yoxall, Burton on Trent, Staffordshire DE15 8NU (GB)

( * ) Notice: Subject to any disclaimer, the term of this patent is extended or adjusted under 35 U.S.C. 154(b) by 0 days.

(21) Appl. No.: 09/653,922

(22) Filed: Sep. 1, 2000

(30) Foreign Application Priority Data

Sep. 2, 1999 (GB) .................................................. 9920622

(51) Int. Cl.[7] .................................................. G08G 1/01
(52) U.S. Cl. .................. 340/933; 340/686.1; 340/687; 414/401
(58) Field of Search ................................. 340/933, 309.5, 340/686.1, 687; 320/116, 117; 414/401, 498

(56) References Cited

U.S. PATENT DOCUMENTS

| | | | |
|---|---|---|---|
| 4,843,373 | 6/1989 | Trickle et al. | 340/540 |
| 5,045,834 | * 9/1991 | Hutchcraft | 340/436 |
| 5,453,735 | * 9/1995 | Hahn | 340/687 |
| 5,831,540 | * 11/1998 | Sullivan et al. | 340/679 |
| 5,940,012 | * 8/1999 | Studebaker | 340/932.2 |
| 5,953,928 | * 9/1999 | Saia, III et al. | 62/239 |
| 5,999,087 | * 12/1999 | Gunton | 340/309.5 |
| 6,188,198 | * 2/2001 | Gunton | 320/117 |

FOREIGN PATENT DOCUMENTS 0 192 350    8/1986   (EP) .
0 441 310    8/1991   (EP) .

* cited by examiner

*Primary Examiner*—Edward Lefkowitz
*Assistant Examiner*—Davetta W. Goins
(74) *Attorney, Agent, or Firm*—Smith-Hill and Bedell

(57) ABSTRACT

Loading bay dock control apparatus 28 includes a co-ordinator circuit 30 and activators 32 for each of the functions of the loading bay dock. Individual manual controls 38 can operate individual functions. In addition, a master control 40 operates to cause the co-ordinator 30 to instruct activators 32 to operate in accordance with a pre-arranged sequence in order to open or close the dock in a safe manner.

9 Claims, 5 Drawing Sheets

Figure 3:
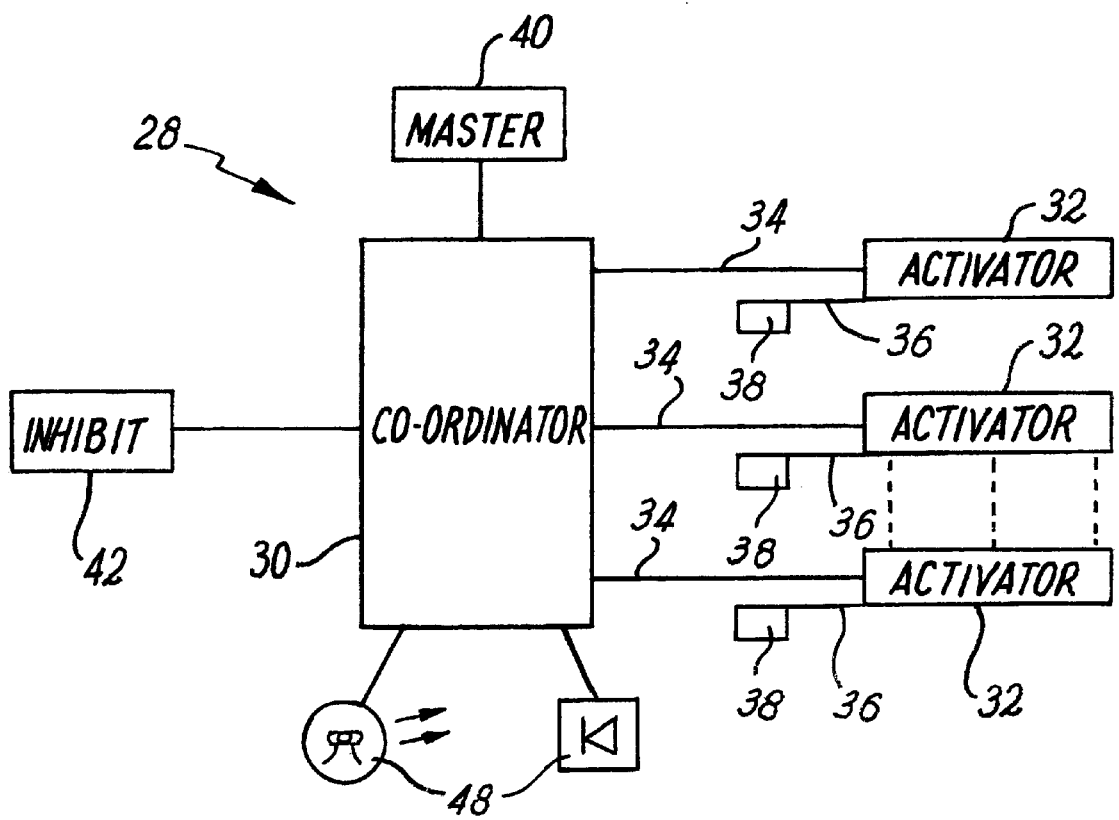

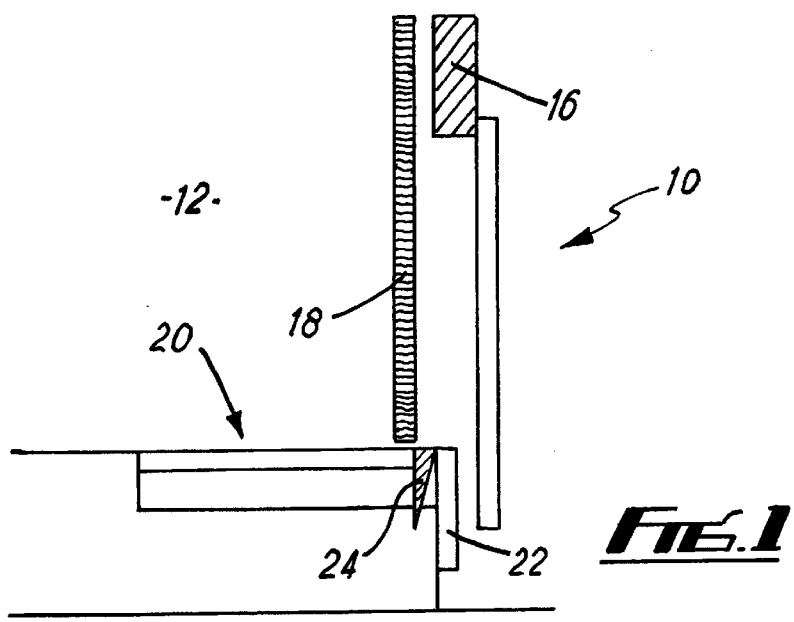
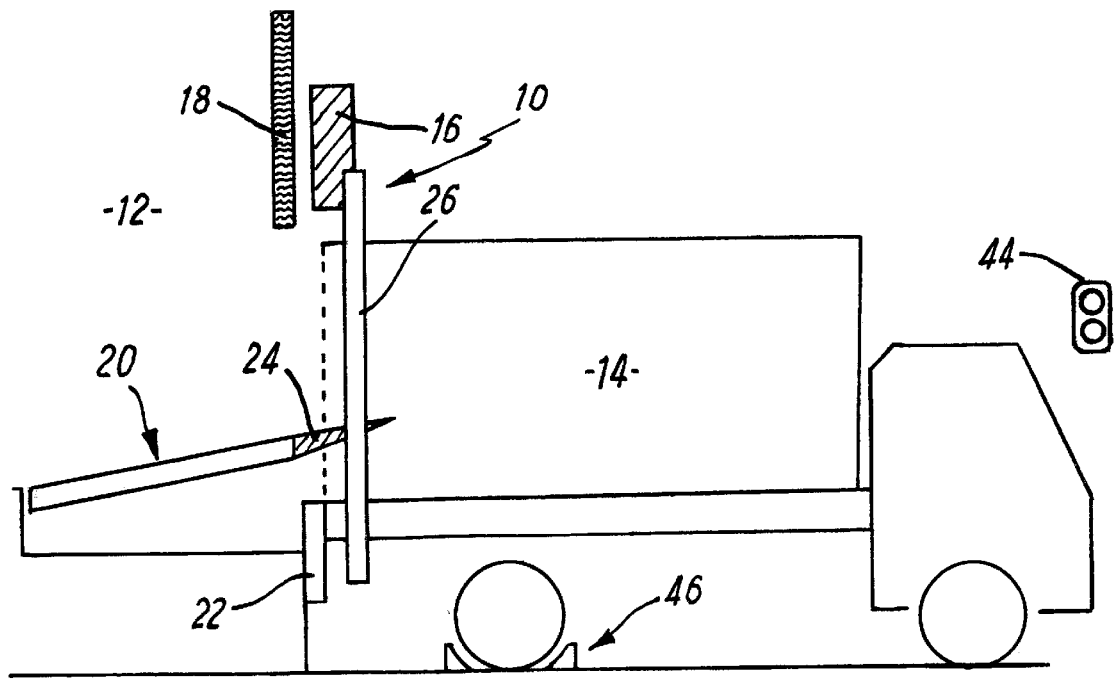

LOADING BAY DOCK CONTROL

The present invention relates to loading bay dock control.

It is common practice to provide warehouse loading bays with docks for receiving vehicles (particularly road vehicles) being loaded or unloaded. Typically, a road vehicle is reversed into the dock to allow it to be loaded or unloaded. The dock may incorporate various features to provide for ease of loading and unloading, for safety, and for insulation, particularly with refrigerated vehicles or buildings. Proper operation of the dock, to ensure safety of personnel, and to avoid damage to the vehicles or the goods, can require some care and concentration from an operator.

The present invention provides loading bay dock control apparatus comprising a plurality of activator means operable to activate respective functions of a loading bay dock with which the apparatus is in use, and coordinator means operable upon manual command to instruct operation of activator means in accordance with a pre-arranged sequence, therebeing inhibitor means associated with the coordinator means and pre-settable to selectively inhibit operation of activator means, the coordinator means being operable to interrogate the inhibitor means prior to instructing operation of any activator means, and to refrain from instructing operation of that activator means in the event that the inhibitor means so indicates.

Preferably the apparatus comprises manual primary control means operable to instruct the coordinator means to commence executing the sequence. The apparatus may further comprise a plurality of manual activator control means corresponding with respective activator means and operable to instruct selective operation of individual activator means. The activator control means are preferably covered to prevent manual access except by removal of the cover. The cover may provide a control panel on which the primary control means is provided, whereby the primary control means is more easily accessed than the activator control means.

Preferably the inhibitor means comprises a plurality of inhibitor elements which may be individually interrogated by the control means, each inhibitor element corresponding with a respective activator means and having first and second states indicating respectively that the activator means is and is not available for operation within the sequence. The inhibitor elements may comprise switch arrangements. The switch arrangements may comprise electrical switches, removable elements, or data in a storage means.

Preferably activator means are provided for operation of at least one of (a) a truck latch or vehicle restraint device for retaining a vehicle; within the dock, (b) an inflatable airseal for sealing the dock around the vehicle; (c) a door of the dock: (d) a leveller device for bridging between the dock and the vehicle; (e) one or more sound or light indicators indicating the status of dock functions or of the sequence.

Figure 5:
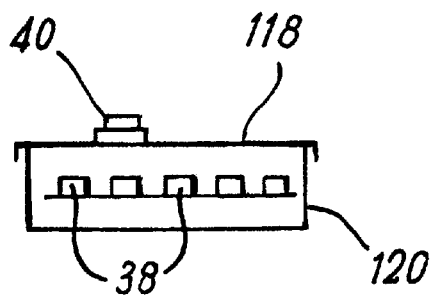
Figure 4A:
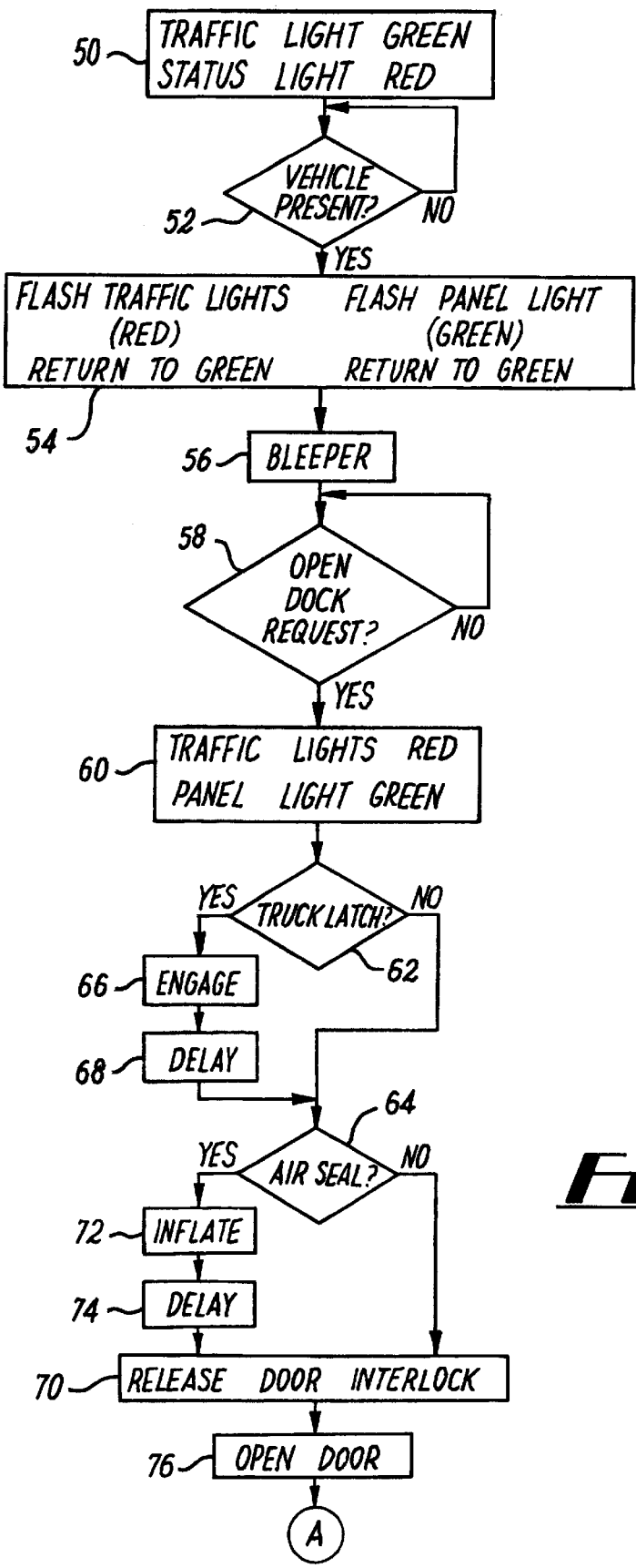
Figure 4B:
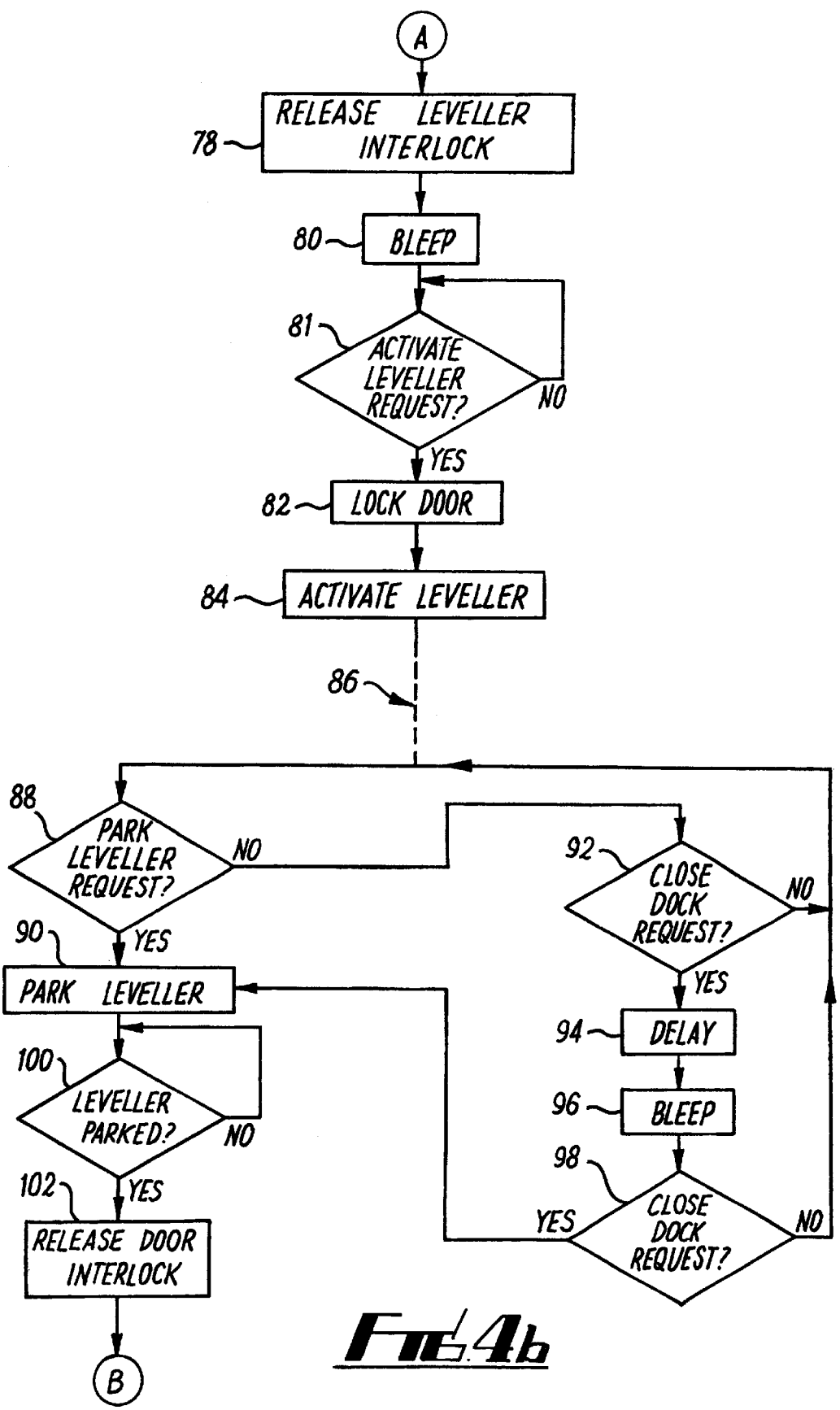
Figure 4C:
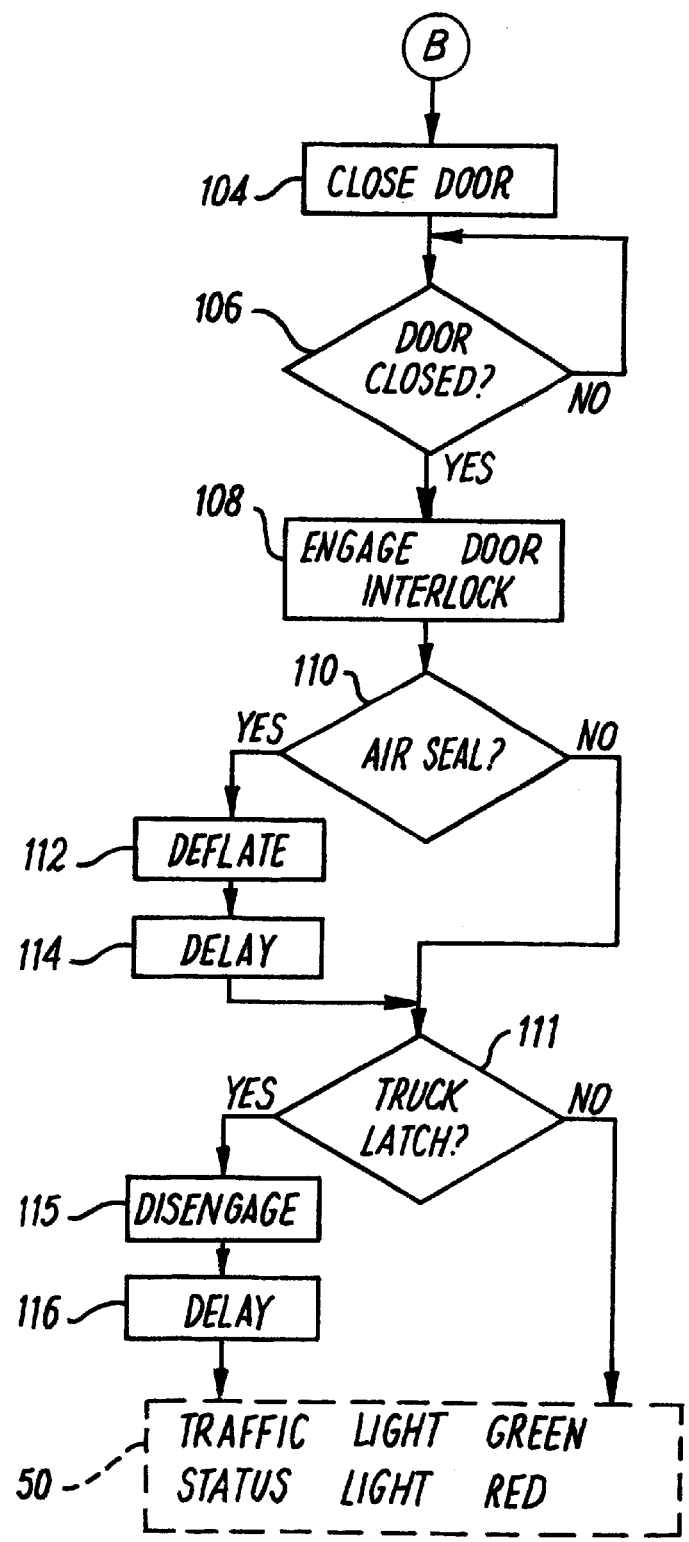

Embodiments of the present invention will now be described in more detail by way of example only, and with reference to the accompanying drawings, in which:

FIG. 1 is a schematic elevation through a loading bay dock with which apparatus according to the present invention may be used, the dock being shown empty and closed;

FIG. 2 corresponds with FIG. 1, showing the dock occupied and open;

FIG. 3 is a schematic block diagram of apparatus according to the present invention;

FIGS. 4a, 4b and 4c form a flow diagram describing operation of the apparatus of FIG. 3; and FIG. 5 is a highly schematic diagram indicating one aspect of the physical layout of the apparatus of FIG. 3.

FIG. 1 shows a loading bay dock for use in loading and unloading goods between a warehouse 12 and a road vehicle 14 (not shown in FIG. 1). The dock 10 illustrated in FIG. 1 is in a building which has an outer wall 16, inside which a vertical sliding door 18 is provided, shown closed in FIG. 1. Inside the door 18 a region of floor is provided by a leveller device 20, shown stowed in FIG. 1. Outside the door 18, a buffer 22 is provided, against which a road vehicle 14 may be manoeuvred.

FIG. 2 shows the dock 10 almost ready for use to load or unload the vehicle 14. The vehicle 14 has been reversed against the buffer 22. The door 18 is open. The leveller 20 has been raised and extended out through the door opening onto the tail of the vehicle 14, to bridge any gap between the buffer 22 and the vehicle 14. As the leveller 20 extends, a lip 24 is hinged up from the stowed position shown in FIG. 1, to extend further forward into the vehicle 14 (FIG. 2). An inflatable seal member 26 has been activated by inflation, to provide a seal around the vehicle 14, closing off the door opening against ingress of weather, or providing insulation from the external environment, in the event that the vehicle 14 and the warehouse 12 are both refrigerated.

The dock 10 is brought into use by lowering the leveller 20 until resting on the bed of the vehicle 14.

When the vehicle 14 has been fully loaded or unloaded, the operations are reversed, with the seal 26 been deflated, the leveller 20 moved to its stowed position (FIG. 1), the door closed, and the vehicle driven away.

This sequence of operations is achieved in accordance with the invention by the apparatus shown in FIG. 3.

The apparatus 28 includes a coordinator circuit 30, which maybe microprocessor based. Activators 32 are provided for each of the functions of the loading bay dock In particular, there are activators 32 for a truck latch 46 operable to hold a vehicle 14 in the dock 10; for causing the seal 26 to inflate or deflate; for opening and closing the door 18; for operating the leveller 20; and for various control functions and sound or light indicators, to be described. Each activator is able to receive instructions at 34 from the coordinator 30 in order to activate the appropriate function of the dock. In addition, instructions can be received at 36 from individual manual controls (preferably push switches) 38, by means of which an operator can instruct activation of an individual function.

The coordinator 30, however, is controlled by a master control 40 which, when operated, causes the coordinator 30 to instruct activators 32 in accordance with a pre-arranged sequence, in order to open or close the dock 10. However, the sequence which is effected is further influenced by inhibitor circuit 42. The inhibitor circuit 42 is connected with the coordinator 30 and contains pre-set information indicating which, if any, of the dock functions is to be inhibited, i.e. is not to form part of the pre-arranged sequence. The inhibitor circuit 42 may consist of a bank of switches, with one switch corresponding with each function. Alternatively, connectors or links could be provided on a circuit board. Alternatively, the inhibitor circuit 42 could include a store for digital data, such as a string of binary digits each indicating whether a respective dock function is inhibited or allowed.

In operation of the apparatus 28, as will be described below, the coordinator 30 will seek to instruct the activators 32 in accordance with the prearranged sequence, but before instructing any activator 32 at the appropriate point in the sequence, the coordinator 30 will check the inhibitor circuit 42 to see if the corresponding function is inhibited. If not, the function will be activated. If the function is inhibited, the coordinator 30 will step to the next point in the sequence, checking again the corresponding function to see if it is inhibited or allowed.

More detailed operation of the apparatus 30 can be described with reference to the flow diagram in FIG. 4. In addition to the features described above, this makes reference to other features of the apparatus and of the dock, such as traffic lights 44 for signalling to the driver of the vehicle 14; annunciator lights and sounders 48 provided for the operator of the apparatus 28; and locks and interlocks which disable various components. In addition, various sensors will be provided around the dock 10, to sense the current status and position of various components, as will become apparent.

In FIG. 4, step 50 illustrates the position shown in FIG. 1, with the dock 10 closed and no vehicle present. The traffic lights 44 will show green to indicate that a vehicle maybe manoeuvred into dock 10. A red light 48 will be shown in the apparatus 28, to inform the operator that the dock is closed and no vehicle is present.

Step 52 senses for the presence of a vehicle, either by means of a sensor in the buffer 22, a switch operated by a driver once he has correctly manoeuvred his vehicle 14 into the dock 10, some other form of truck sensor or a switch controlled by the dock operator. The form of sensor can be identified by the setting of the inhibitor circuit 42, allowing the apparatus to be readily adapted for alternative applications. When the presence of a vehicle has been detected, step 54 announces this to the driver and dock operator by flashing the traffic lights 44 red, then returning them to green, and by flashing the panel light 48 green and then returning it to red. At step 56 the sounder 48 on the panel is sounded to ensure that the dock operator is alert.

Step 58 then waits for the dock operator to operate the master control 40. Once that has been operated, step 60 indicates this to the driver and dock operator by turning the traffic lights 44 red, and turning the panel light 48 green.

Step 62 then follows, in which the coordinator 30 checks with the inhibitor circuit 42 to see whether or not truck latch operation is inhibited, that, whether or not a truck latch 46 is present in the arrangement. If not, the system moves on to step 64. If the inhibitor circuit 42 indicates that a truck latch is present (that is, that the operations related to the truck latch are not inhibited), the coordinator 30 instructs the appropriate activator 32 to engage the truck latch, at step 66. Step 68 then introduces a delay before reaching step 64.

In step 64, the coordinator 30 checks the inhibitor circuit 42 to see if the activation of an airseal 26 is inhibited or not. Naturally, this operation will be inhibited if no seal is present in the dock, but will normally not be inhibited if a seal is present. In the event that the seal operation is inhibited, the system moves to step 70. In the event that airseal activation is not inhibited, step 72 is executed, with the coordinator 30 instructing the appropriate activator 32 to inflate the seal 26. Once full inflation of the seal 26 has been detected, or after an appropriate delay provided by step 74, to allow full inflation of the seal 26, the system moves to step 70 at which an interlock preventing movement of the door 18 is released. Step 76 then follows with the door 18 being opened. At step 78, an interlock preventing operation of the leveller 20 is released. Release of the leveller interlock is announced to the dock operator at step 80 by operation of the sounder 48.

The dock operator can now instruct operation of the leveller by activation of an appropriate control. The system waits for this request at step 80 before moving to step 82 in which the door 18 is locked (now being open), before activation of the leveller 20 is instructed by the coordinator 30, at step 84. It is to be realised that activation of the leveller may be more or less complex according to the design of the leveller, but these details do not themselves form part of the invention and are within the scope of the suitably skilled reader.

At this point of the sequence, after the leveller has been activated, the dock 10 is fully open and safe for loading or unloading the vehicle 14. The vehicle is in place, latched (if a truck latch is present), and the door 18 is open, the seal 26 inflated and the leveller 20 in position, bridging across to the vehicle bed. The traffic lights 44 are showing red to instruct a driver not to move the vehicle.

A long and arbitrary delay is then to be expected, indicated by the broken lines at 86, before the vehicle has been fully loaded or unloaded and is to moved away from the dock 10. This is indicated to the apparatus 28 at step 88, at which the sequence waits for a request to park the leveller 20, this request being made by the dock operator operating an appropriate control button or the like. Once this request has been received, the sequence moves on to step 90, at which the leveller is parked However, if the request is not received, the system checks for operation of the master control 40 to request full closure of the dock, at step 92. If that request has not been received, the sequence returns to step 88. As has been stated, if a request to park the leveller is received at step 88, the sequence moves to step 90. However, if a request to close the dock is first received at step 92, a delay occurs at step 94, the sounder 48 is operated at step 96 to acknowledge the request, and the sequence then waits at 98 for a further request by operation of the master control 40. If the second operation of the master switch 40 is not received, the sequence returns to steps 88 and 92, and closing of the dock does not commence. However, if the second activation is received at step 98, the sequence moves to step 90.

Steps 92 and 98 are present to ensure that the dock operator must operate the control 40 twice before full automatic closure of the dock can take place, thus allowing the operator to positively confirm that dock closure is required, avoiding possible danger arising from the closure of the dock upon accidental activation of the control 40.

At step 90, the coordinator 30 instructs the appropriate activator 32 to withdraw the leveller 20 to the parked position (FIG. 1). Step 100 waits for a sensor to indicate that the leveller has been parked, or introduces an appropriate delay to allow the leveller to be parked. Once the leveller is parked, the door interlock is released at step 102 and the door is closed at step 104. At step 106, the sequence waits for an indication from a sensor that the door has fully closed, or allows an appropriate delay to elapse allowing the door to close. Once the door is closed, an interlock is engaged at step 108, to prevent the door being reopened.

Step 110 is then executed, with the coordinator 30 checking the inhibitor circuit 42 to see if operation of the airseal 26 is inhibited or not. If inhibited, the sequence moves onto step 110. If not, the seal 26 is deflated at 112 and a delay at 114 allows full deflation, before moving to step 111. Step 111 is then executed by the coordinator 30 checking for inhibition of the truck latch 46. If inhibited, the sequence moves to the final step, which is step 50, the beginning of the sequence described above. If a truck latch is present, this is disengaged at step 115 and after a delay at 116, the sequence returns to step 50. At step 50, the traffic light 44 is turned to green to indicate to the driver of the vehicle that the vehicle 14 can be removed from the dock 10. The status light 48 turns red to indicate to the dock operator that the dock has been closed and the vehicle released.

Thus, it can be seen that the sequence provides for the automatic execution of a prearranged sequence of steps, but that at each stage, steps which maybe optional, such as the operation of a truck latch, can be checked in the inhibitor circuit 42 to see if they have been inhibited. If they have not, they can be activated as normal. If they have been inhibited, the sequence can immediately move onto the next stage, checking the inhibitor circuit 42, if appropriate. Consequently, the apparatus 28 is extremely versatile in its application. If the full sequence represented by the flow diagram of FIG. 4 includes appropriate provision for all possible functions of loading bay docks, then the apparatus 28 will be able to control a complex dock having all of those features, or a simpler dock from which some of those features have been omitted. In the latter case, the inhibitor circuit 42 would be set to inhibit the sequence from performing those functions not present in the dock being controlled. A single design of control apparatus can then be tailored by appropriate setting of the inhibitor circuit 42, to control a wide range of docks 90 to be encountered in practice, FIG. 5 illustrates highly schematically the physical layout of the master control 40 and the individual controls 36. FIG. 5 shows a control panel 118 covering a control housing 120. The master control 40 is mounted on the control panel 118, to be highly visible and readily accessible to a dock operator. Operation of the master control 40 allows the dock operator to use a single control to initiate a complete sequence for closing or opening the dock, as has been described. However, there maybe occasions on which individual functions need to be activated, such as during testing or while a system is being installed. When this is required, the control panel 118 can be removed to expose the controls 36, which can then be individually activated to instruct the corresponding activator 32 to initiate the appropriate function.

It will readily apparent that many additional features and functions could be included in the apparatus and sequence described above. In particular, it is envisaged that a single override control (a "panic" button) could be provided allow the complete operation to be stopped in the case of an emergency. Alternatively or in addition, there maybe a control termed a "deadman handle" which is required to be continually activated in order for the sequence to continue, so that in the event of the dock operator becoming distracted, becoming ill or losing concentration, unsupervised operation will be prevented.

The apparatus has been described with reference to road vehicles and warehouses, but it will be apparent that the apparatus is equally applicable to other loading applications, such as trains, boats or aeroplanes (either for passengers or for freight), Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

What is claimed is:

1. A loading bay dock control apparatus comprising a plurality of activator means operable to activate respective functions of a loading bay dock with which the apparatus is in use, and co-ordinator means operable upon manual command to instruct operation of activator means in accordance with a pre-arranged sequence, there being inhibitor means associated with the co-ordinator means and pre-settable to selectively inhibit operation of each respective activator means, the coordinator means being operable to interrogate the inhibitor means prior to instructing operation of any activator means, and to refrain from instructing operation of that activator means in the event that the inhibitor means so indicates, wherein the inhibitor means comprises a plurality of inhibitor elements which the coordinator means is able to interrogate individually, each inhibitor element corresponding with a respective activator means and having first and second states set prior to operation and indicating respectively that the activator means is and is not available for operation within the sequence.

2. Apparatus according to claim 1, comprising manual primary control means operable to instruct the co-ordinator means to commence executing the sequence.

3. Apparatus according to claim 1, wherein the apparatus further comprises a plurality of manual activator control means corresponding with respective activator means and operable to instruct selective operation of individual activator means.

4. Apparatus according to claim 3, wherein the activator control means are covered to prevent manual access except by removal of the cover.

5. Apparatus according to claim 4, further comprising manual primary control means operable to instruct the co-ordinator means to commence executing the sequence, wherein the cover provides a control panel on which the primary control means is provided, whereby the primary control means is more easily accessed than the activator control means.

6. Apparatus according to claim 1, wherein the inhibitor elements comprise switch arrangements.

7. Apparatus according to claim 6, wherein the switch arrangements comprise electrical switches, removable elements, or data in a storage means.

8. Apparatus according to claim 1, wherein activator means are provided for operation of at least one of (a) a truck latch or vehicle restraint device for retaining a vehicle within the dock; (b) an inflatable airseal for sealing the dock around the vehicle; (c) a door of the dock; (d) a leveller device for bridging between the dock and the vehicle; (e) one or more sound or light indicators indicating the status of dock functions or of the sequence.

9. A method of installing a universal loading bay dock controller into a loading bay dock, wherein the loading bay dock controller is capable of controlling N loading bay dock features, where N is a positive integer greater than two, wherein the loading dock controller has N inhibitor elements each one of which is capable of inhibiting the operation of a respective one of N loading bay dock features, wherein each one of the N inhibitor elements has first and second states set prior to operation and indicating respectively that an associated loading bay dock feature is and is not available for operation, wherein the loading bay dock has M loading bay dock features, where M is a positive integer less than N, the method comprising the step of configuring the universal loading bay dock controller prior to operation so that during operation M of the N inhibitor elements are placed in the first state and at least one of the inhibitor elements is placed in the second state.

* * * * *